US012362650B2

(12) United States Patent
Fang et al.

(10) Patent No.: US 12,362,650 B2
(45) Date of Patent: Jul. 15, 2025

(54) SWITCH-MODE POWER CONVERTERS WITH CONTROL OF TURNING OFF TRANSISTORS FOR ZERO-VOLTAGE SWITCHING

(71) Applicant: ON-BRIGHT ELECTRONICS (SHANGHAI) CO., LTD., Shanghai (CN)

(72) Inventors: Qian Fang, Shanghai (CN); Yun Sun, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 307 days.

(21) Appl. No.: 18/118,003

(22) Filed: Mar. 6, 2023

(65) Prior Publication Data

US 2023/0283165 A1    Sep. 7, 2023

(30) Foreign Application Priority Data

Mar. 7, 2022  (CN) .......................... 202210225382.2

(51) Int. Cl.
*H02M 3/335*  (2006.01)
*H02M 1/00*  (2006.01)
*H02M 1/08*  (2006.01)

(52) U.S. Cl.
CPC ......... *H02M 1/083* (2013.01); *H02M 1/0009* (2021.05); *H02M 3/33571* (2021.05)

(58) Field of Classification Search
CPC .............. H02M 1/083; H02M 1/0009; H02M 3/33571; H02M 1/0058; H02M 3/01;
(Continued)

(56) References Cited

U.S. PATENT DOCUMENTS 6,385,059 B1    5/2002  Telefus et al.
9,674,903 B2    6/2017  Moon et al.
(Continued)

FOREIGN PATENT DOCUMENTS

CN        103066855 A     4/2013
CN        107426874 A    12/2017
(Continued)

OTHER PUBLICATIONS

Taiwan Patent Office, Office Action mailed Nov. 10, 2023, in Application No. 112117187.
(Continued)

*Primary Examiner* — Kyle J Moody
(74) *Attorney, Agent, or Firm* — Faegre Drinker Biddle & Reath LLP

(57) ABSTRACT

Controller and method for a power converter. For example, a controller for a power converter includes: a first drive signal generator configured to generate a first drive signal and output the first drive signal to a first transistor configured to receive an input voltage and related to a primary winding coupled to an auxiliary winding and a secondary winding related to an output voltage; a second drive signal generator configured to generate a second drive signal and output the second drive signal to a second transistor coupled to the first transistor and related to the primary winding; a demagnetization detector configured to generate a demagnetization signal based at least in part on a first voltage related to the auxiliary winding, the demagnetization signal indicating an end of a demagnetization process; and a first controller configured to generate a first control signal.

30 Claims, 6 Drawing Sheets

(58) Field of Classification Search
CPC ........ H02M 7/219; H02M 1/44; H02M 3/155; H02M 5/10
See application file for complete search history.

(56) References Cited

U.S. PATENT DOCUMENTS

| | | | |
|---|---|---|---|
| 9,787,198 B1 * | 10/2017 | Cao | H02M 3/33515 |
| 10,103,616 B1 * | 10/2018 | Lin | H02M 1/083 |
| 10,277,131 B2 | 4/2019 | Zhang et al. | |
| 11,205,950 B2 | 12/2021 | Lau et al. | |
| 11,451,155 B2 | 9/2022 | Ng et al. | |
| 2014/0133192 A1 | 5/2014 | Lin et al. | |
| 2014/0140109 A1 | 5/2014 | Valley | |
| 2019/0222131 A1 | 7/2019 | King | |
| 2020/0112241 A1 | 4/2020 | Wang et al. | |
| 2021/0006147 A1 | 1/2021 | Feldtkeller | |
| 2023/0283165 A1 * | 9/2023 | Fang | H02M 3/01 363/21.12 |
| 2023/0291315 A1 | 9/2023 | Yang et al. | |
| 2023/0327570 A1 | 10/2023 | Yang et al. | |
| 2024/0313657 A1 | 9/2024 | Fang et al. | |
| 2024/0322695 A1 * | 9/2024 | Fang | H02M 1/007 |

FOREIGN PATENT DOCUMENTS

| | | |
|---|---|---|
| CN | 108809107 A | 11/2018 |
| CN | 211237683 U | 8/2020 |
| CN | 113193758 A | 7/2021 |
| CN | 113708631 A | 11/2021 |
| CN | 113992018 A | 1/2022 |
| CN | 115224951 A | 10/2022 |
| CN | 115360918 A | 11/2022 |
| CN | 115694145 A | 2/2023 |
| JP | 2016-042765 A | 3/2016 |
| TW | 201603444 A | 1/2016 |
| TW | 201926877 A | 7/2019 |
| TW | 202008703 A | 2/2020 |
| TW | 202201891 A | 1/2022 |
| TW | M623787 U | 2/2022 |
| TW | 202230940 A | 8/2022 |

OTHER PUBLICATIONS

Taiwan Patent Office, Office Action mailed Nov. 10, 2023, in Application No. 112117188.
Taiwan Patent Office, Office Action mailed Nov. 16, 2023, in Application No. 111123512.
Taiwan Patent Office, Office Action mailed Oct. 23, 2023, in Application No. 111122734.
Taiwan Patent Office, Office Action mailed Sep. 12, 2023, in Application No. 111126161.
United States Patent and Trademark Office, Notice of Allowance mailed Jan. 7, 2025, in U.S. Appl. No. 18/111,853.
United States Patent and Trademark Office, Notice of Allowance mailed Mar. 5, 2025, in U.S. Appl. No. 18/125,559.

* cited by examiner

SWITCH-MODE POWER CONVERTERS WITH CONTROL OF TURNING OFF TRANSISTORS FOR ZERO-VOLTAGE SWITCHING

1. CROSS-REFERENCES TO RELATED APPLICATIONS

This application claims priority to Chinese Patent Application No. 202210225382.2, filed Mar. 7, 2022, incorporated by reference herein for all purposes.

2. BACKGROUND OF THE INVENTION

Certain embodiments of the present invention are directed to circuits. More particularly, some embodiments of the invention provide controllers and methods for control of turning off transistors for zero-voltage switching. Merely by way of example, some embodiments of the invention have been applied to asymmetrical half-bridge flyback switch-mode powers. But it would be recognized that the invention has a much broader range of applicability.

The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level. The power converters include linear converters and switch-mode converters. The switch-mode converters often are implemented with various architectures, such as the fly-back architecture, the buck architecture, and/or the boost architecture. Fly-back switch-mode power converters, especially ones with low-voltage switching and/or zero-voltage switching (ZVS), are often used as power supply devices because of their small size, high frequency, and/or high power density.

FIG. 1 is a simplified diagram showing a conventional asymmetrical half-bridge flyback switch-mode power converter. The asymmetrical half-bridge flyback switch-mode power converter 100 includes a primary winding 110, a secondary winding 112, transistors 120 and 130, a bridge rectifier 140, a diode 142, a resistor 144, and capacitors 150, 152 and 154. In some examples, each transistor of the transistors 120 and 130 is a metal-oxide-semiconductor field-effect transistor (MOSFET). For example, the transistor 120 includes a drain terminal 122, a gate terminal 124, and a source terminal 126, and the transistor 130 includes a drain terminal 132, a gate terminal 134, and a source terminal 136. As an example, the capacitor 152 includes capacitor terminals 156 and 158, and the diode 142 includes an anode 146 and a cathode 148.

As shown in FIG. 1, the asymmetrical half-bridge flyback switch-mode power converter 100 receives an AC voltage 190 and generates an output voltage 192. The gate terminal 124 receives a drive voltage 125, and the gate terminal 134 receives a drive voltage 135. The source terminal 126 of the transistor 120 and the drain terminal 132 of the transistor 130 are connected to the capacitor terminal 156 of the capacitor 152 and biased to a voltage 127. The capacitor terminal 158 is connected to the primary winding 110. If a current 153 flows to the capacitor terminal 156, the current 153 has a positive value, and if the current 153 flows from the capacitor terminal 156, the current 153 has a negative value. Additionally, the anode 146 is connected to the secondary winding 112. If a current 143 flows to the anode 146, the current 143 has a positive value, and if the current 143 flows from the anode 146, the current 143 has a negative value. Also, the drain terminal 122 of the transistor 120 receives a voltage 151, and the source terminal 136 of the transistor 130 is biased to a ground voltage (e.g., 0 volts).

FIG. 2 shows simplified timing diagrams for the conventional asymmetrical half-bridge flyback switch-mode power converter 100 as shown in FIG. 1. The waveform 225 represents the drive voltage 125 as a function of time, the waveform 235 represents the drive voltage 135 as a function of time, the waveform 253 represents the current 153 as a function of time, the waveform 243 represents the current 143 as a function of time, and the waveform 227 represents the voltage 127 as a function of time.

At time $t_0$, the drive voltage 125 changes from a logic low level to a logic high level as shown by the waveform 225, and the transistor 120 becomes turned on. From time $t_0$ to time $t_1$, the drive voltage 125 remains at the logic high level as shown by the waveform 225, and the transistor 120 remains turned on. For example, from time $t_0$ to time $t_1$, the voltage 151 charges the primary winding 110 through the capacitor 152, and the current 153 flows to the capacitor terminal 156. As an example, from time $t_0$ to time $t_1$, the current 153 has a positive value that increases with time, as shown by the waveform 253.

At time $t_1$, the drive voltage 125 changes from the logic high level to the logic low level as shown by the waveform 225, and the transistor 120 becomes turned off. For example, at time $t_1$, the voltage 151 stops charging the primary winding 110. From time $t_1$ to time $t_2$, the primary winding 110 is used to discharge the parasitic capacitor of the transistor 130, and the voltage 127 decreases with time as shown by the waveform 227.

At time $t_2$, the voltage 127 decreases to zero volts, and the drive voltage 135 changes from the logic low level to the logic high level as shown by the waveform 235. For example, at time $t_2$, the transistor 130 becomes turned on with zero-voltage switching (ZVS).

From time $t_2$ to time $t_3$, the drive voltage 135 remains at the logic high level as shown by the waveform 235, and the transistor 130 remains turned on. For example, from time $t_2$ to time $t_3$, the capacitor 152 and the primary winding 110 undergo resonance, and the current 153 decreases to zero and then becomes negative as shown by the waveform 253. As an example, from time $t_2$ to time $t_3$, the current 143 has a positive value as shown by the waveform 243, and the primary winding 110 undergoes a demagnetization process.

At time $t_3$, the demagnetization process of the primary winding 110 ends. For example, at time $t_3$, the current 143 becomes equal to zero as shown by the waveform 243. As an example, at time $t_3$, the current 153 also becomes equal to zero as shown by the waveform 253.

From time $t_3$ to time $t_4$, the drive voltage 135 remains at the logic high level as shown by the waveform 235, and the transistor 130 remains turned on. The length of time duration from time $t_3$ to time $t_4$ is a predetermined constant for the asymmetrical half-bridge flyback switch-mode power converter 100 as shown in FIG. 1. For example, from time $t_3$ to time $t_4$, the capacitor 152 discharges through the transistor 130, and the current 153 flows from the capacitor terminal 156. As an example, from time $t_3$ to time $t_4$, the current 153 has a negative value that decreases with time as shown by the waveform 253.

At time $t_4$, the drive voltage 135 changes from the logic high level to the logic low level as shown by the waveform 235, and the transistor 130 becomes turned off. For example, at time $t_4$, the capacitor 152 stops discharging.

From time $t_4$ to time $t_5$, the primary winding 110 is used to discharge the parasitic capacitor of the transistor 120, and the current 153 flows from the capacitor terminal 156. For example, from time $t_4$ to time $t_5$, the current 153 has a negative value that increases with time as shown by the waveform 253. As an example, from time $t_4$ to time $t_5$, the voltage 127 increases with time as shown by the waveform 227.

At time $t_5$, the voltage 127 becomes equal to the voltage 151 as shown by the waveform 227, and the drive voltage 125 changes from the logic low level to the logic high level as shown by the waveform 225. For example, at time $t_5$, the transistor 120 becomes turned on with zero-voltage switching (ZVS).

Hence it is highly desirable to improve the technique for switch-mode power converters.

3. BRIEF SUMMARY OF THE INVENTION

Certain embodiments of the present invention are directed to circuits. More particularly, some embodiments of the invention provide controllers and methods for control of turning off transistors for zero-voltage switching. Merely by way of example, some embodiments of the invention have been applied to asymmetrical half-bridge flyback switch-mode powers. But it would be recognized that the invention has a much broader range of applicability.

According to some embodiments, a controller for a power converter includes: a first drive signal generator configured to generate a first drive signal and output the first drive signal to a first transistor configured to receive an input voltage and related to a primary winding coupled to an auxiliary winding and a secondary winding related to an output voltage; a second drive signal generator configured to generate a second drive signal and output the second drive signal to a second transistor coupled to the first transistor and related to the primary winding; a demagnetization detector configured to generate a demagnetization signal based at least in part on a first voltage related to the auxiliary winding, the demagnetization signal indicating an end of a demagnetization process; and a first controller configured to generate a first control signal based at least in part on the demagnetization signal and a first current related to the auxiliary winding; wherein the second drive signal generator is further configured to: receive the first control signal; and generate the second drive signal based at least in part on the first control signal; wherein the first controller is further configured to: determine a time duration that starts at the end of the demagnetization process based at least in part on the first current; and at an end of the time duration, change the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding.

According to certain embodiments, a controller for a power converter includes: a first drive signal generator configured to generate a first drive signal and output the first drive signal to a first transistor configured to receive an input voltage and related to a primary winding coupled to a secondary winding and an auxiliary winding; a second drive signal generator configured to generate a second drive signal and output the second drive signal to a second transistor coupled to the first transistor and related to the primary winding; a frequency controller configured to generate a frequency control signal; and a first controller configured to generate a first control signal based at least in part on the frequency control signal and a first current related to the auxiliary winding; wherein the second drive signal generator is further configured to: receive the first control signal; and generate the second drive signal based at least in part on the first control signal; wherein the first controller is further configured to: determine a time duration that starts at a time when the frequency control signal changes; and at an end of the time duration, change the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding.

According to some embodiments, a method for a power converter includes: generating a first drive signal; outputting the first drive signal to a first transistor configured to receive an input voltage and related to a primary winding coupled to an auxiliary winding and a secondary winding related to an output voltage; generating a second drive signal; outputting the second drive signal to a second transistor coupled to the first transistor and related to the primary winding; generating a demagnetization signal based at least in part on a first voltage related to the auxiliary winding, the demagnetization signal indicating an end of a demagnetization process; and generating a first control signal based at least in part on the demagnetization signal and a first current related to the auxiliary winding; wherein the generating a second drive signal includes: receiving the first control signal; and generating the second drive signal based at least in part on the first control signal; wherein the generating a first control signal based at least in part on the demagnetization signal and a first current includes: determining a time duration that starts at the end of the demagnetization process based at least in part on the first current; and at an end of the time duration, changing the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding.

According to certain embodiments, a method for a power converter includes: generating a first drive signal; outputting the first drive signal to a first transistor configured to receive an input voltage and related to a primary winding coupled to a secondary winding and an auxiliary winding; generating a second drive signal; outputting the second drive signal to a second transistor coupled to the first transistor and related to the primary winding; generating a frequency control signal; and generating a first control signal based at least in part on the frequency control signal and a first current related to the auxiliary winding; wherein the generating a second drive signal includes: receiving the first control signal; and generating the second drive signal based at least in part on the first control signal; wherein the generating a first control signal based at least in part on the frequency control signal and a first current includes: determining a time duration that starts at a time when the frequency control signal changes; and at an end of the time duration, changing the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide controllers and methods for control of turning off transistors for zero-voltage switching. Merely by way of example, some embodiments of the invention have been applied to asymmetrical half-bridge flyback switch-mode powers. But it would be recognized that the invention has a much broader range of applicability.

Figure 2:
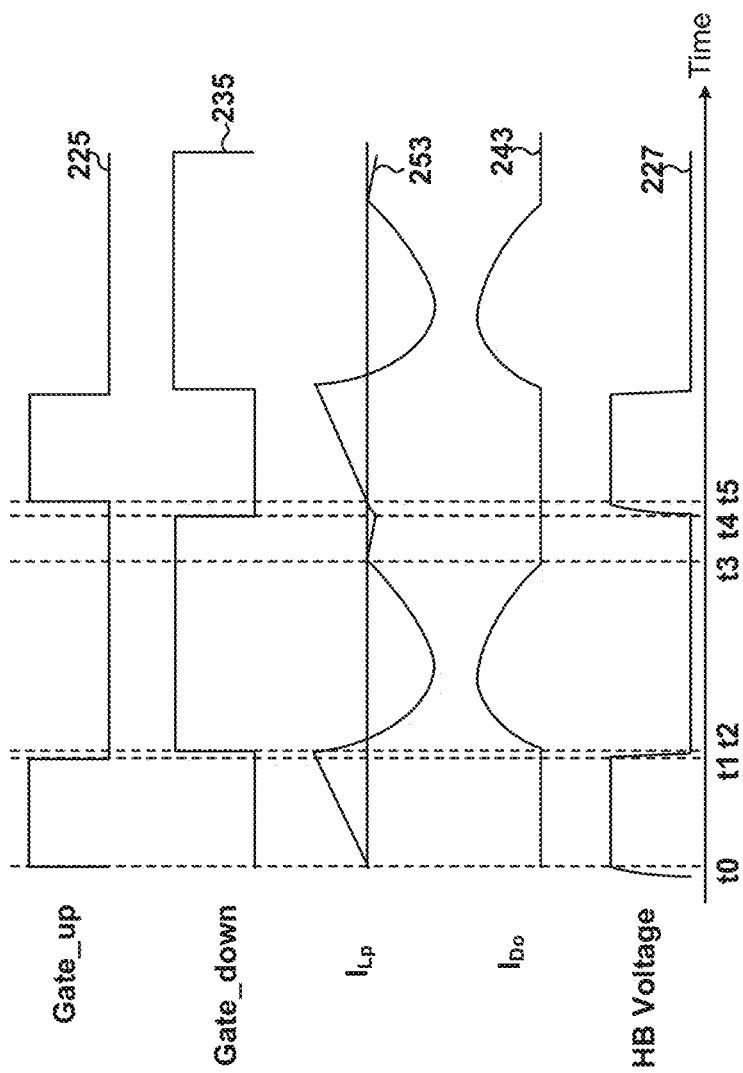
FIG. 2 shows simplified timing diagrams for the conventional asymmetrical half-bridge flyback switch-mode power converter as shown in FIG. 1.

As shown in FIG. 2, at time $t_1$, the current 153 has a positive value that reaches a peak magnitude according to certain embodiments. For example, at time $t_1$, the peak magnitude of the current 153 represents a resonance energy that is large enough to cause the voltage 127 to resonate to zero volts at time $t_2$. As an example, at time $t_2$, with the voltage 127 at zero volts, the transistor 130 becomes turned on with zero-voltage switching (ZVS).

According to some embodiments, after the transistor 130 becomes turned off at time $t_4$, whether the voltage 127 can resonate to the voltage 151 and thus achieve zero-voltage switching (ZVS) of the transistor 120 depends on the negative value of the current 153 at time $t_4$. For example, the negative value of the current 153 at time $t_4$ is determined at least in part by the length of time duration from time $t_3$ to time $t_4$. As an example, in order to achieve zero-voltage switching (ZVS) of the transistor 120 at time $t_5$, the voltage 127 needs to resonate to the voltage 151 at time $t_5$.

Figure 1:
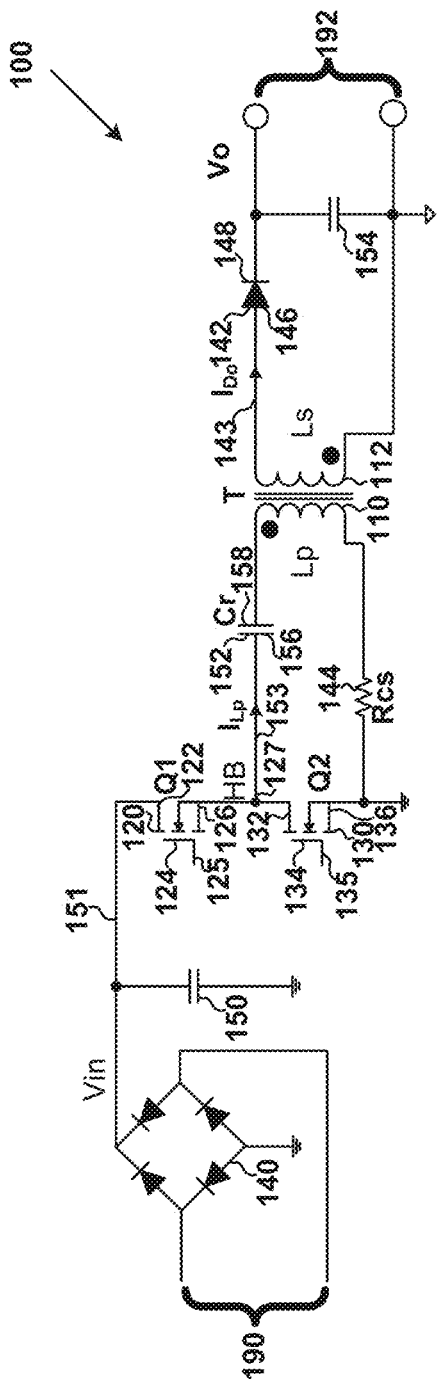
FIG. 1 is a simplified diagram showing a conventional asymmetrical half-bridge flyback switch-mode power converter.

In certain embodiments, as the voltage 151 changes, the length of time duration from time $t_3$ to time $t_4$ that is needed for the voltage 127 to resonate to the voltage 151 at time $t_5$ also changes. In some examples, the length of time duration from time $t_3$ to time $t_4$ is a predetermined constant for the asymmetrical half-bridge flyback switch-mode power converter 100 as shown in FIG. 1, so the voltage 127 cannot resonate to the voltage 151 at time $t_5$ for different values of the voltage 151. For example, if the length of time duration from time $t_3$ to time $t_4$ is too short for a given value of the voltage 151, the voltage 127 resonate to a value less than the voltage 151 at time $t_5$, and the transistor 120 cannot achieve zero-voltage switching (ZVS) of at time $t_5$. As an example, if the length of time duration from time $t_3$ to time $t_4$ is too long for a given value of the voltage 151, the negative value of the current 153 at time $t_4$ would be too small, causing the peak magnitude reached by the positive value of the current 153 to become too large and thus increasing the conduction loss of the transistors 120 and 130.

As shown in FIG. 1, if the ratio of the number of turns of the primary winding 110 to the number of turns of the secondary winding 112 is equal to N, the voltage difference between the capacitor terminals 156 and 158 is equal to the output voltage 192 multiplied by N according to some embodiments. For example, in order for the voltage 127 to resonate to the voltage 151, the resonance energy needed is determined as follows:

$$E_r = 2 \times \frac{1}{2} \times C_{oss} \times (V_{in} - V_o \times N)^2 \qquad \text{(Equation 1)}$$

where $E_r$ represents the resonance energy needed for the voltage 127 to resonate to the voltage 151. Additionally, $C_{oss}$ represents the capacitance of the parasitic capacitor of the transistor 120, and also represents the capacitance of the parasitic capacitor of the transistor 130. Moreover, $V_{in}$ represents the voltage 151, and $V_o$ represents the output voltage 192. Also, N represents the ratio of the number of turns of the primary winding 110 to the number of turns of the secondary winding 112. As an example, when the transistor 130 is turned off, the energy stored in the primary winding 110 is determined as follows:

$$E_p = \frac{1}{2} \times L_p \times I_p^2 \qquad \text{(Equation 2)}$$

where $E_p$ represents the energy stored in the primary winding 110. Additionally, $L_p$ represents inductance of the primary winding 110, and $I_p$ represents the current 153.

In certain examples, the resonance energy (e.g., $E_r$) needed for the voltage 127 to resonate to the voltage 151 is equal to the energy (e.g., $E_p$) stored in the primary winding 110 when the transistor 130 is turned off (e.g., at time $t_4$), so that when the transistor 130 becomes turned off, the current 153 is determined as follows:

$$I_{p\_off} = (V_{in} - V_o \times N) \times \sqrt{\frac{2 \times C_{oss}}{L_p}} \qquad \text{(Equation 3)}$$

where $I_{p\_off}$ represents the magnitude of the current 153 when the transistor 130 becomes turned off (e.g., at time $t_4$). For example, at time $t_4$, the current 153 has a negative value. Additionally, $V_{in}$ represents the voltage 151, and $V_o$ represents the output voltage 192. Also, N represents the ratio of the number of turns of the primary winding 110 to the number of turns of the secondary winding 112. Moreover, $C_{oss}$ represents the capacitance of the parasitic capacitor of the transistor 120, and $L_p$ represents inductance of the primary winding 110.

In some examples, the current 153 when the transistor 130 becomes turned off (e.g., at time $t_4$) and the time duration (e.g., $T_{zvs}$) from the end of demagnetization of the secondary winding 112 (e.g., time $t_3$) to the time when the transistor 130 becomes turned off (e.g., time $t_4$) have the following relationship:

$$L_p \times I_{p\_off} = V_o \times T_{ZVS} \quad \text{(Equation 4)}$$

where $L_p$ represents inductance of the primary winding 110, and $I_{p\_off}$ represents the magnitude of the current 153 when the transistor 130 becomes turned off (e.g., at time $t_4$). For example, at time $t_4$, the current 153 has a negative value. Additionally, $V_o$ represents the output voltage 192. Also, $T_{zvs}$ represents the time duration from the end of demagnetization of the secondary winding 112 (e.g., time $t_3$) to the time when the transistor 130 becomes turned off (e.g., time $t_4$).

According to certain embodiments, based on Equations 3 and 4, in order for the voltage 127 to resonate to the voltage 151, the asymmetrical half-bridge flyback switch-mode power converter 100 as shown in FIG. 1 needs to be modified so that the time duration from the end of demagnetization of the secondary winding 112 (e.g., time $t_3$) to the time when the transistor 130 becomes turned off (e.g., time $t_4$) becomes as follows:

$$T_{ZVS} = \frac{V_{in} - V_o \times N}{V_o} \times \sqrt{2 \times L_p \times C_{oss}} \quad \text{(Equation 5)}$$

where $T_{zvs}$ represents the time duration from the end of demagnetization of the secondary winding 112 (e.g., time $t_3$) to the time when the transistor 130 becomes turned off (e.g., time $t_4$). Additionally, $V_{in}$ represents the voltage 151, and $V_o$ represents the output voltage 192. Also, N represents the ratio of the number of turns of the primary winding 110 to the number of turns of the secondary winding 112. Moreover, $C_{oss}$ represents the capacitance of the parasitic capacitor of the transistor 120, and $L_p$ represents inductance of the primary winding 110.

According to some embodiments, based on Equation 5, in order for the voltage 127 to resonate to the voltage 151, if the output voltage 192 (e.g., $V_o$) remains constant, the asymmetrical half-bridge flyback switch-mode power converter 100 as shown in FIG. 1 needs to be modified in order to satisfy the following relationship:

$$T_{ZVS} \propto (V_{in} - V_o \times N) \quad \text{(Equation 6)}$$

where $T_{zvs}$ represents the time duration from the end of demagnetization of the secondary winding 112 (e.g., time $t_3$) to the time when the transistor 130 becomes turned off (e.g., time $t_4$). Additionally, $V_{in}$ represents the voltage 151, and $V_o$ represents the output voltage 192. Also, N represents the ratio of the number of turns of the primary winding 110 to the number of turns of the secondary winding 112. For example, in order for the transistor 120 to achieve zero-voltage switching (ZVS) (e.g., at time $t_5$), if the output voltage 192 (e.g., $V_o$) remains constant, the asymmetrical half-bridge flyback switch-mode power converter 100 as shown in FIG. 1 needs to be modified so that $T_{zvs}$ becomes directly proportional to ($V_{in} - V_o \times N$).

Figure 3:
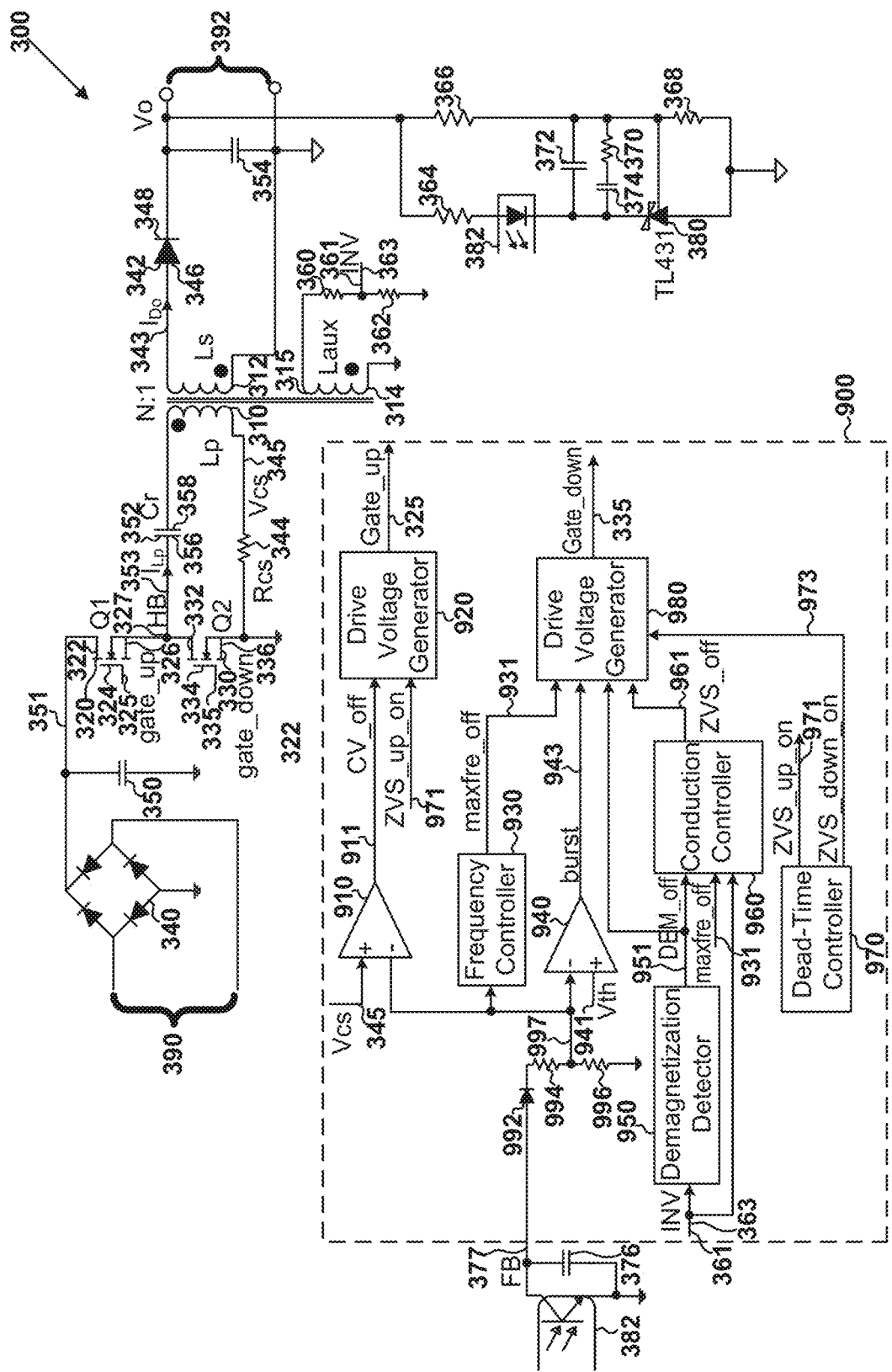
FIG. 3 is a simplified diagram showing an asymmetrical half-bridge flyback switch-mode power converter according to certain embodiments of the present invention.

FIG. 3 is a simplified diagram showing an asymmetrical half-bridge flyback switch-mode power converter according to certain embodiments of the present invention. This diagram is merely an example, which should not unduly limit the scope of the claims. One of ordinary skill in the art would recognize many variations, alternatives, and modifications. The asymmetrical half-bridge flyback switch-mode power converter 300 includes a primary winding 310, a secondary winding 312, an auxiliary winding 314, transistors 320 and 330, a bridge rectifier 340, a diode 342, a resistor 344, capacitors 350, 352 and 354, resistors 360, 362, 364, 366, 368 and 370, capacitors 372, 374 and 376, a shunt regulator 380 (e.g., TL431), an optocoupler 382, and a controller 900. The controller 900 includes a comparator 910, a drive voltage generator 920, a frequency controller 930, a comparator 940, a demagnetization detector 950, a conduction controller 960, a dead-time controller 970, a drive voltage generator 980, a diode 992, and resistors 994 and 996. In some examples, each transistor of the transistors 320 and 330 is a metal-oxide-semiconductor field-effect transistor (MOSFET). For example, the transistor 320 includes a drain terminal 322, a gate terminal 324, and a source terminal 326, and the transistor 330 includes a drain terminal 332, a gate terminal 334, and a source terminal 336. As an example, the capacitor 352 includes capacitor terminals 356 and 358, and the diode 342 includes an anode 346 and a cathode 348. In certain examples, the primary winding 310, the secondary winding 312, and the auxiliary winding 314 are coupled to each other as parts of a transformer. Although the above has been shown using a selected group of components for the asymmetrical half-bridge flyback switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 3, the asymmetrical half-bridge flyback switch-mode power converter 300 receives an AC voltage 390 and generates an output voltage 392 according to some embodiments. For example, the gate terminal 324 receives a drive voltage 325 (e.g., a drive signal), and the gate terminal 334 receives a drive voltage 335 (e.g., a drive signal). As an example, the source terminal 326 of the transistor 320 and the drain terminal 332 of the transistor 330 are connected to the capacitor terminal 356 of the capacitor 352 and biased to a voltage 327. In certain examples, the capacitor terminal 358 is connected to the primary winding 310. For example, if a current 353 flows to the capacitor terminal 356, the current 353 has a positive value, and if the current 353 flows from the capacitor terminal 356, the current 353 has a negative value. In some examples, the anode 346 is connected to the secondary winding 312. For example, if a current 343 flows to the anode 346, the current 343 has a positive value, and if the current 343 flows from the anode 346, the current 343 has a negative value. As an example, the drain terminal 322 of the transistor 320 receives a voltage 351 (e.g., an input voltage), and the source terminal 336 of the transistor 330 is biased to a ground voltage (e.g., 0 volts).

In certain embodiments, the controller 900 receives a feedback voltage 377 and a current sensing voltage 345 and generate the drive voltage 325 based at least in part on the feedback voltage 377 and the current sensing voltage 345. For example, the drive voltage 325 is used to turn on and/or turn off the transistor 320. In some examples, the feedback voltage 377 represents the output voltage 392, and the current sensing voltage 345 represents the current 353. In certain examples, the drive voltage generator 920 (e.g., a drive signal generator) receives a comparison signal 911 and a signal 971 and generates the drive voltage 325 (e.g., a drive signal) based at least in part on the comparison signal 911 and the signal 971 to turn on and/or turn off the transistor 320.

In some embodiments, the controller 900 also receives a voltage 361 and/or a current 363 and generates the drive voltage 335 based at least in part on the feedback voltage 377 and the voltage 361 and/or the current 363. For example, the current 363 flows out of the controller 900. As an example, the drive voltage 335 is used to turn on and/or turn off the transistor 330. In certain examples, the voltage 361 represents a voltage 315 of the auxiliary winding 314. For example, one terminal of the resistor 360 and one terminal of the resistor 362 are connected to each other and are both biased to the voltage 361. In some examples, the current 363 represents the voltage 315 of the auxiliary winding 314. As an example, the current 363 is generated to flow out of the controller 900 and then flows from the resistor 360 to the auxiliary winding 314 without going through the resistor 362. As shown in FIG. 3, the drive voltage generator 980 (e.g., a drive signal generator) receives a signal 931, a comparison signal 943, a demagnetization signal 951, a signal 961 and a signal 973, and generates the drive signal 335 (e.g., a drive signal) based at least in part on the signal 931, the comparison signal 943, the demagnetization signal 951, the signal 961 and the signal 973 to turn on and/or turn off the transistor 330 according to certain embodiments.

According to some embodiments, the resistors 364, 366, 368 and 370, the capacitors 372, 374 and 376, the shunt regulator 380 (e.g., TL431), and the optocoupler 382 are used to generate the feedback voltage 377 based at least in part on the output voltage 392. For example, the feedback voltage 377 represents the output voltage 392. In certain examples, based at least in part on the feedback voltage 377, the diode 992 and the resistors 994 and 996 generate a voltage 997. For example, the feedback voltage 377 is reduced by the forward bias voltage of the diode 992 and then by the voltage divider that includes the resistors 994 and 996 in order to obtain the voltage 997. As an example, the voltage 997 represents the output voltage 392. In some examples, the voltage 997 is received by the comparator 910, which also receives the current sensing voltage 345. For example, the comparator 910 generates the comparison signal 911 based at least in part on the current sensing voltage 345 and the voltage 997, and outputs the comparison signal 911 to the drive voltage generator 920. As an example, if the current sensing voltage 345 becomes larger than the voltage 997, the comparison signal 911 changes from a logic low level to a logic high level. In certain examples, in response to the comparison signal 911 changing from the logic low level to the logic high level, the drive voltage generator 920 changes the drive voltage 325 from the logic high level to the logic low level in order to turn off the transistor 320.

In certain embodiments, the frequency controller 930 receives the voltage 997 and generates the signal 931 based at least in part on the voltage 997. For example, the signal 931 (e.g., a frequency control signal) is used to control the operation frequency of the asymmetrical half-bridge flyback switch-mode power converter 300. As an example, the signal 931 (e.g., a frequency control signal) is used to reduce the operation frequency of the asymmetrical half-bridge flyback switch-mode power converter 300 when the load becomes lighter. In some examples, the signal 931 is at the logic high level and/or at the logic low level.

In some embodiments, the comparator 940 receives the voltage 997 and a threshold voltage 941 and generates the comparison signal 943 based at least in part on the voltage 997 and the threshold voltage 941. In certain examples, when the load of the asymmetrical half-bridge flyback switch-mode power converter 300 becomes very light, the comparison signal 943 changes from the logic low level to the logic high level. For example, if the comparison signal 943 is at the logic high level, the drive voltage 335 remains at the logic low level and the transistor 330 remains turned off, causing the transistor 320 to also remain turned off. As an example, if the comparison signal 943 is at the logic low level, the drive voltage 335 is generated based at least in part on the signal 931, the demagnetization signal 951, the signal 961 and/or the signal 973. In certain embodiments, the demagnetization detector 950 receives the voltage 361 and generates the demagnetization signal 951. For example, if the demagnetization process of the primary winding 310 ends, the demagnetization signal 951 changes from the logic low level to the logic high level.

According to some embodiments, the conduction controller 960 receives the demagnetization signal 951, the signal 931 and the current 363 and generates the signal 961 based at least in part on the demagnetization signal 951, the signal 931 and the current 363. For example, the conduction controller 960 outputs the signal 961 to the drive voltage generator 980. As an example, if the signal 961 changes from the logic low level to the logic high level, the drive voltage generator 980 changes the drive voltage 335 from the logic high level to the logic low level to turn off the transistor 330.

According to some embodiments, the dead-time controller 970 generates signals 971 and 973. In certain examples, the signal 971 is received by the drive voltage generator 920, and the signal 973 is received by the drive voltage generator 980. For example, in response to the signal 971 changing from the logic low level to the logic high level, the drive voltage generator 920 changes the drive voltage 325 from the logic low level to the logic high level in order to turn on the transistor 320. As an example, in response to the signal 973 changing from the logic low level to the logic high level, the drive voltage generator 980 changes the drive voltage 335 from the logic low level to the logic high level in order to turn on the transistor 330.

In certain examples, the dead-time controller 970 detects the drive voltage 325 changes from the logic high level to the logic low level, and then after a first predetermined dead-time duration (e.g., a first predetermined delay), changes signal 973 from the logic low level to the logic high level to change the drive voltage 335 from the logic low level to the logic high level. For example, the transistor 330 is turned on by the drive signal 335 the first predetermined dead-time duration (e.g., a first predetermined delay) after the transistor 320 is turned off. As an example, during the first predetermined dead-time duration (e.g., a first predetermined delay), both transistors 320 and 330 are turned off. In some examples, the dead-time controller 970 detects the drive voltage 335 changes from the logic high level to the logic low level, and then after a second predetermined dead-time period (e.g., a second predetermined delay), changes signal 971 from the logic low level to the logic high level to change the drive voltage 325 from the logic low level to the logic high level. For example, the transistor 320 is turned on by the drive signal 325 the second predetermined dead-time duration (e.g., a second predetermined delay) after the transistor 330 is turned off. As an example, during the second predetermined dead-time duration (e.g., a second predetermined delay), both transistors 320 and 330 are turned off. In certain examples, the first predetermined dead-time duration (e.g., a first predetermined delay) and the second predetermined dead-time duration (e.g., a second predetermined delay) are not equal in length.

According to some embodiments, after the drive voltage 325 changes from the logic low level to the logic high level and the transistor 320 becomes turned on, the voltage 351 charges the primary winding 310 through the capacitor 352 and the current 353 flows to the capacitor terminal 356 with a positive value that increases with time. For example, when the positive value of the current 353 increases with time, the current sensing voltage 345 also increases with time. As an example, if the current sensing voltage 345 becomes larger than the voltage 997, the drive voltage 325 changes from the logic high level to the logic low level to turn off the transistor 320. In certain examples, after the transistor 320 becomes turned off, the primary winding 310 is used to discharge the parasitic capacitor of the transistor 330, and the voltage 327 decreases with time. For example, the first predetermined dead-time duration (e.g., a first predetermined delay) after the transistor 320 becomes turned off, with the voltage 327 at zero volts, the drive voltage 335 changes from the logic low level to the logic high level and the transistor 330 becomes turned on with zero-voltage switching (ZVS).

According to certain embodiments, the conduction controller 960 uses the demagnetization signal 951, the signal 931 and the current 363 to determine when to change the signal 961 from the logic low level to the logic high level in order to turn off the transistor 330. For example, after the transistor 330 becomes turned off, the primary winding 310 is used to discharge the parasitic capacitor of the transistor 320, and the current 353 flows from the capacitor terminal 356 with a negative value, causing the voltage 327 to increase with time. As an example, the second predetermined dead-time duration (e.g., a second predetermined delay) after the transistor 330 becomes turned off, with the voltage 327 being equal to the voltage 151, the drive voltage 325 changes from the logic low level to the logic high level and the transistor 320 becomes turned on with zero-voltage switching (ZVS).

Figure 4:
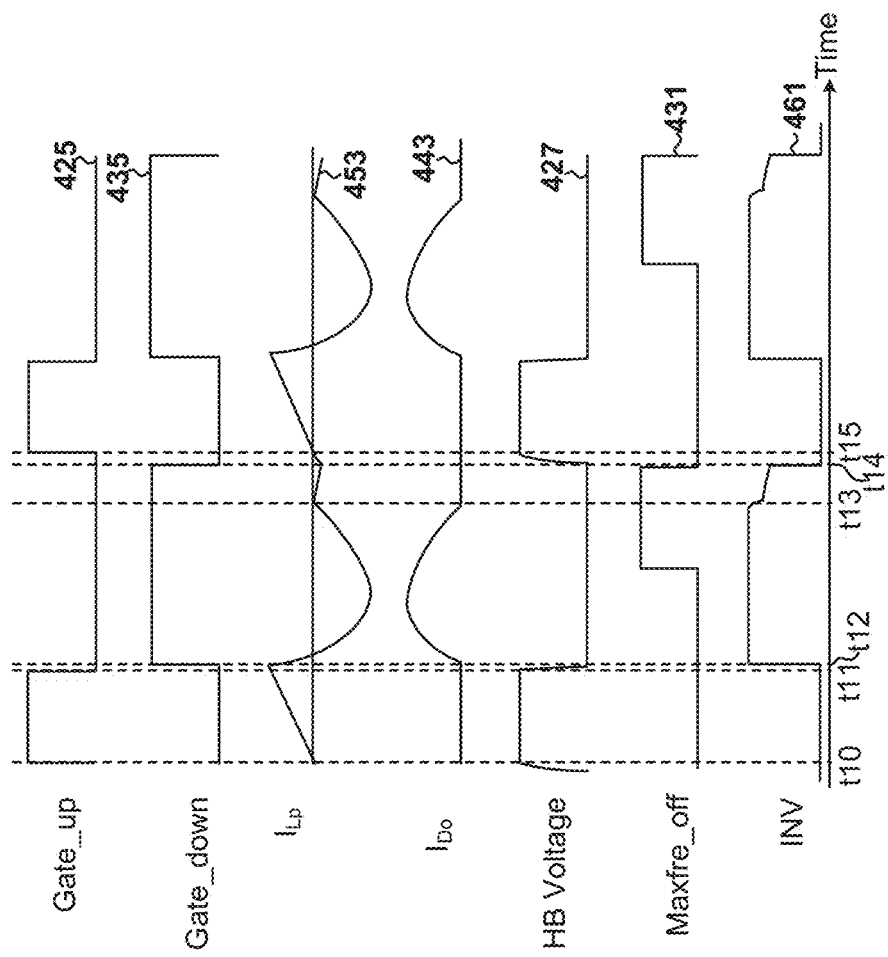
FIG. 4 shows simplified timing diagrams for the asymmetrical half-bridge flyback switch-mode power converter 300 as shown in FIG. 3 that operates in the continuous conduction mode according to some embodiments of the present invention.
Figure 5:
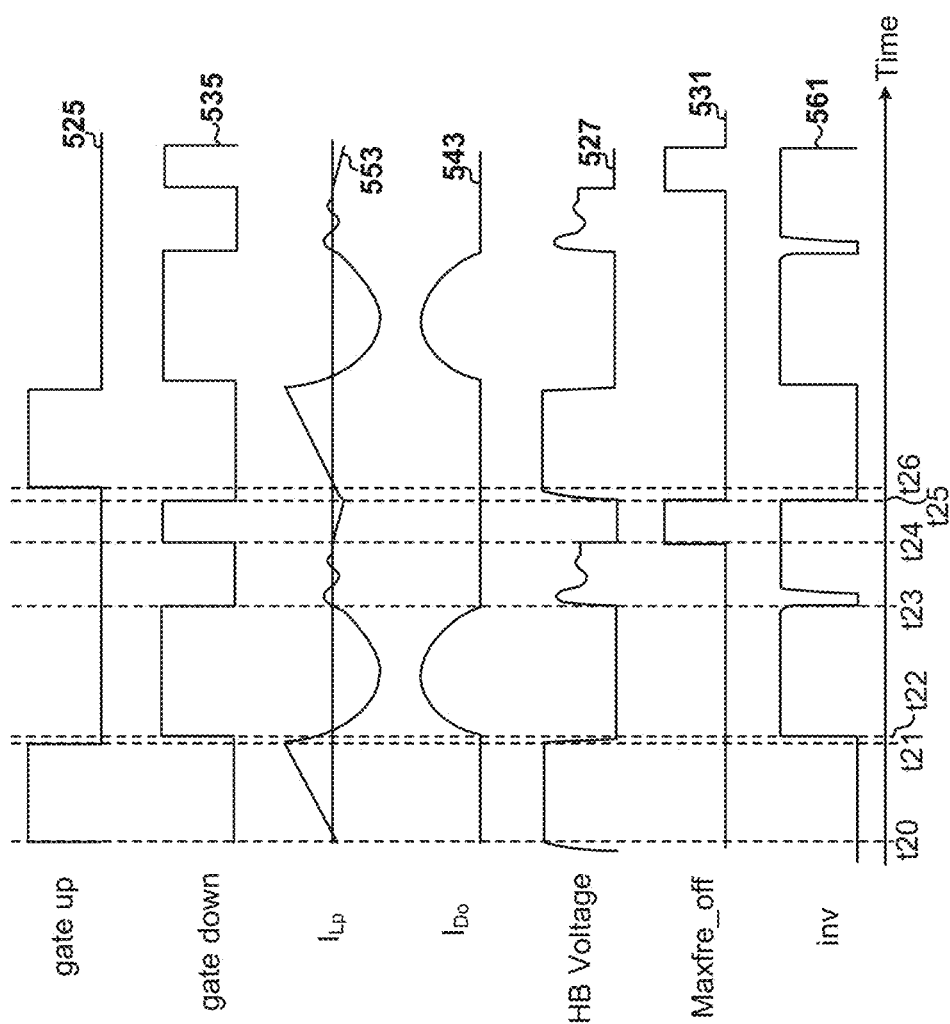
FIG. 5 shows simplified timing diagrams for the asymmetrical half-bridge flyback switch-mode power converter 300 as shown in FIG. 3 that operates in the discontinuous conduction mode according to certain embodiments of the present invention.

As shown in FIG. 3, the asymmetrical half-bridge flyback switch-mode power converter 300 can operate in different modes. For example, if the signal 931 changes from the logic low level to the logic high level before the end of the demagnetization process of the primary winding 310 (e.g., before the demagnetization signal 951 changes from the logic low level to the logic high level), the asymmetrical half-bridge flyback switch-mode power converter 300 operates in the continuous conduction mode as shown in FIG. 4. As an example, if the signal 931 changes from the logic low level to the logic high level after the end of the demagnetization process of the primary winding 310 (e.g., after the demagnetization signal 951 changes from the logic low level to the logic high level), the asymmetrical half-bridge flyback switch-mode power converter 300 operates in the discontinuous conduction mode as shown in FIG. 5.

FIG. 4 shows simplified timing diagrams for the asymmetrical half-bridge flyback switch-mode power converter 300 as shown in FIG. 3 that operates in the continuous conduction mode according to some embodiments of the present invention. These diagrams are merely examples, which should not unduly limit the scope of the claims. One of ordinary skill in the art would recognize many variations, alternatives, and modifications. The waveform 425 represents the drive voltage 325 as a function of time, the waveform 435 represents the drive voltage 335 as a function of time, the waveform 453 represents the current 353 as a function of time, the waveform 443 represents the current 343 as a function of time, the waveform 427 represents the voltage 327 as a function of time, the waveform 431 represents the signal 931 as a function of time, and the waveform 461 represents the voltage 361 as a function of time.

At time $t_{10}$, the drive voltage 325 changes from the logic low level to the logic high level as shown by the waveform 425, and the transistor 320 becomes turned on according to certain embodiments. In some examples, from time $t_{10}$ to time $t_{11}$, the drive voltage 325 remains at the logic high level as shown by the waveform 425, and the transistor 320 remains turned on. For example, from time $t_{10}$ to time $t_{11}$, the voltage 351 charges the primary winding 310 through the capacitor 352, and the current 353 flows to the capacitor terminal 356. As an example, from time $t_{10}$ to time $t_{11}$, the current 353 has a positive value that increases with time as shown by the waveform 453, causing the current sensing voltage 345 to also increase with time.

At time $t_{11}$, the current sensing voltage 345 becomes larger than the voltage 997, and the drive voltage 325 changes from the logic high level to the logic low level as shown by the waveform 425, causing the transistor 320 to become turned off according to some embodiments. For example, at time $t_{11}$, the voltage 351 stops charging the primary winding 310. In certain examples, from time $t_{11}$ to time $t_{12}$, the primary winding 310 is used to discharge the parasitic capacitor of the transistor 330, and the voltage 327 decreases with time as shown by the waveform 427.

At time $t_{12}$, the voltage 327 decreases to zero volts, and the drive voltage 335 changes from the logic low level to the logic high level as shown by the waveform 435 according to certain embodiments. For example, at time $t_{12}$, the transistor 330 becomes turned on with zero-voltage switching (ZVS).

From time $t_{12}$ to time $t_{13}$, the drive voltage 335 remains at the logic high level as shown by the waveform 435, and the transistor 330 remains turned on according to some embodiments. In certain examples, from time $t_{12}$ to time $t_{13}$, the capacitor 352 and the primary winding 310 undergo resonance, and the current 353 decreases to zero and then becomes negative as shown by the waveform 453. For example, from time $t_{12}$ to time $t_{13}$, the current 343 has a positive value as shown by the waveform 443, and the primary winding 310 undergoes a demagnetization process.

At time $t_{13}$, the demagnetization detector 950 detects the end of the demagnetization process of the primary winding 310 based at least in part on the downward slope of the voltage 361 as shown by the waveform 461 and changes the demagnetization signal 951 from the logic low level to the logic high level according to certain embodiments. For example, at time $t_{13}$, the current 343 becomes equal to zero as shown by the waveform 443. As an example, at time $t_{13}$, the current 353 also becomes equal to zero as shown by the waveform 453.

From time $t_{13}$ to time $t_{14}$, the signal 931 remains at the logic high level as shown by the waveform 431, and the drive voltage 335 remains at the logic high level as shown by the waveform 435, causing the transistor 330 to remain turned on according to some embodiments. For example, from time $t_{13}$ to time $t_{14}$, the capacitor 352 discharges through the transistor 330, and the current 353 flows from the capacitor terminal 356. As an example, from time $t_{13}$ to time $t_{14}$, the current 353 has a negative value that decreases with time as shown by the waveform 453. In certain examples, if the output voltage 392 remains constant, the time duration from time $t_{13}$ to time $t_{14}$ is directly proportional to $(V_{in}-V_o \times N)$, where $V_{in}$ represents the voltage 351, $V_o$ represents the output voltage 392, and N represents the ratio of the number of turns of the primary winding 310 to the number of turns of the secondary winding 312.

At time $t_{14}$, the drive voltage 335 changes from the logic high level to the logic low level as shown by the waveform 435, and the transistor 330 becomes turned off according to certain embodiments. For example, at time $t_{14}$, the capacitor 352 stops discharging.

From time $t_{14}$ to time $t_{15}$, the primary winding 310 is used to discharge the parasitic capacitor of the transistor 320, and the current 353 flows from the capacitor terminal 356 according to some embodiments. For example, from time $t_{14}$ to time $t_{15}$, the current 353 has a negative value that increases with time as shown by the waveform 453. As an example, from time $t_{14}$ to time $t_{15}$, the voltage 327 increases with time as shown by the waveform 427.

At time $t_{15}$, the voltage 327 becomes equal to the voltage 351 as shown by the waveform 427, and the drive voltage 325 changes from the logic low level to the logic high level as shown by the waveform 425 according to certain embodiments. For example, at time $t_{15}$, the transistor 320 becomes turned on with zero-voltage switching (ZVS).

As shown in FIG. 3 and FIG. 4, from time $t_{10}$ to time $t_{12}$, the voltage 361 is clamped to a voltage value that is close to zero volts by the conduction controller 960 as shown by the waveform 461 according to some embodiments. According to certain embodiments, if the output voltage 392 is constant, the time duration from the end of the demagnetization process of the primary winding 310 (e.g., time $t_{13}$) to the time (e.g., time $t_{14}$) when the drive voltage 335 changes from the logic high level to the logic low level is directly proportional to $(V_{in}-V_o \times N)$, where $V_{in}$ represents the voltage 351, $V_o$ represents the output voltage 392, and N represents the ratio of the number of turns of the primary winding 310 to the number of turns of the secondary winding 312. For example, if $V_{in}$ is equal to $V_{in\_a}$ and $V_o$ is equal to $V_{o\_q}$, the time duration from the end of the demagnetization process of the primary winding 310 (e.g., time $t_{13}$) to the time (e.g., time $t_{14}$) when the drive voltage 335 changes from the logic high level to the logic low level is equal to $T_{zvs\_a}$. As an example, if $V_{in}$ is equal to $V_{in\_b}$ and $V_o$ is equal to $V_{o\_q}$, the time duration from the end of the demagnetization process of the primary winding 310 (e.g., time $t_{13}$) to the time (e.g., time $t_{14}$) when the drive voltage 335 changes from the logic high level to the logic low level is equal to $T_{zvs\_b}$. As an example, the ratio of $T_{zvs\_a}$ to $T_{zvs\_b}$ is determined as follows:

$$\frac{T_{ZVS\_a}}{T_{ZVS\_b}} = \frac{V_{in\_a} - V_{o\_q} \times N}{V_{in\_b} - V_{o\_q} \times N} \qquad \text{(Equation 7)}$$

In some examples, according to Equation 7, if the output voltage 392 is constant (e.g., equal to $V_{o\_q}$) but $V_{in}$ changes from $V_{in\_a}$ to $V_{in\_b}$, the time duration from the end of the demagnetization process of the primary winding 310 (e.g., time $t_{13}$) to the time (e.g., time $t_{14}$) when the drive voltage 335 changes from the logic high level to the logic low level changes from $T_{zvs\_a}$ to $T_{zvs\_b}$.

FIG. 5 shows simplified timing diagrams for the asymmetrical half-bridge flyback switch-mode power converter 300 as shown in FIG. 3 that operates in the discontinuous conduction mode according to certain embodiments of the present invention. These diagrams are merely examples, which should not unduly limit the scope of the claims. One of ordinary skill in the art would recognize many variations, alternatives, and modifications. The waveform 525 represents the drive voltage 325 as a function of time, the waveform 535 represents the drive voltage 335 as a function of time, the waveform 553 represents the current 353 as a function of time, the waveform 543 represents the current 343 as a function of time, the waveform 527 represents the voltage 327 as a function of time, the waveform 531 represents the signal 931 as a function of time, and the waveform 561 represents the voltage 361 as a function of time.

At time $t_{20}$, the drive voltage 325 changes from the logic low level to the logic high level as shown by the waveform 525, and the transistor 320 becomes turned on according to certain embodiments. In some examples, from time $t_{20}$ to time $t_{21}$, the drive voltage 325 remains at the logic high level as shown by the waveform 525, and the transistor 320 remains turned on. For example, from time $t_{20}$ to time $t_{21}$, the voltage 351 charges the primary winding 310 through the capacitor 352, and the current 353 flows to the capacitor terminal 356. As an example, from time $t_{20}$ to time $t_{21}$, the current 353 has a positive value that increases with time as shown by the waveform 553, causing the current sensing voltage 345 to also increase with time.

At time $t_{21}$, the current sensing voltage 345 becomes larger than the voltage 997, and the drive voltage 325 changes from the logic high level to the logic low level as shown by the waveform 525, causing the transistor 320 to become turned off according to some embodiments. For example, at time $t_{21}$, the voltage 351 stops charging the primary winding 310. In certain examples, from time $t_{21}$ to time $t_{22}$, the primary winding 310 is used to discharge the parasitic capacitor of the transistor 330, and the voltage 327 decreases with time as shown by the waveform 527.

At time $t_{22}$, the voltage 327 decreases to zero volts, and the drive voltage 335 changes from the logic low level to the logic high level as shown by the waveform 535 according to certain embodiments. For example, at time $t_{22}$, the transistor 330 becomes turned on with zero-voltage switching (ZVS).

From time $t_{22}$ to time $t_{23}$, the drive voltage 335 remains at the logic high level as shown by the waveform 535, and the transistor 330 remains turned on according to some embodiments. In certain examples, from time $t_{22}$ to time $t_{23}$, the capacitor 352 and the primary winding 310 undergo resonance, and the current 353 decreases to zero and then becomes negative as shown by the waveform 553. For example, from time $t_{22}$ to time $t_{23}$, the current 343 has a positive value as shown by the waveform 543, and the primary winding 310 undergoes a demagnetization process.

At time $t_{23}$, the demagnetization detector 950 detects the end of the demagnetization process of the primary winding 310 based at least in part on the downward slope of the voltage 361 as shown by the waveform 561 and changes the demagnetization signal 951 from the logic low level to the logic high level according to certain embodiments. For example, at time $t_{23}$, the current 343 becomes equal to zero as shown by the waveform 543. As an example, at time $t_{23}$, the current 353 also becomes equal to zero as shown by the waveform 553. In some examples, at time $t_{23}$, the signal 931 is at the logic low level as shown by the waveform 531, and the drive voltage 335 changes from the logic high level to the logic low level as shown by the waveform 535.

From time $t_{23}$ to time $t_{24}$, the drive voltage 325 remains at the logic low level as shown by the waveform 525, and the drive voltage 335 also remains at the logic low level as shown by the waveform 535 according to some embodiments. As an example, from time $t_{23}$ to time $t_{24}$, the signal 931 remains at the logic low level as shown by the waveform 531.

At time $t_{24}$, the signal 931 changes from the logic low level to the logic high level as shown by the waveform 531, and the drive voltage 335 changes from the logic low level to the logic high level as shown by the waveform 535, causing the transistor 330 to become turned on according to some embodiments.

From time $t_{24}$ to time $t_{25}$, the signal 931 remains at the logic high level as shown by the waveform 531, and the drive voltage 335 remains at the logic high level as shown by the waveform 535, causing the transistor 330 to remain turned on according to some embodiments. For example, from time $t_{24}$ to time $t_{25}$, the capacitor 352 discharges through the transistor 330, and the current 353 flows from the capacitor terminal 356. As an example, from time $t_{24}$ to time $t_{25}$, the current 353 has a negative value that decreases with time as shown by the waveform 553. In certain examples, if the output voltage 392 remains constant, the time duration from time $t_{24}$ to time $t_{25}$ is directly proportional to $(V_{in} - V_o \times N)$, where $V_{in}$ represents the voltage 351, $V_o$ represents the output voltage 392, and N represents the ratio of the number of turns of the primary winding 310 to the number of turns of the secondary winding 312.

At time $t_{25}$, the drive voltage 335 changes from the logic high level to the logic low level as shown by the waveform 535, and the transistor 330 becomes turned off according to certain embodiments. For example, at time $t_{25}$, the capacitor 352 stops discharging.

From time $t_{25}$ to time $t_{26}$, the primary winding 310 is used to discharge the parasitic capacitor of the transistor 320, and the current 353 flows from the capacitor terminal 356 according to some embodiments. For example, from time $t_{25}$ to time $t_{26}$, the current 353 has a negative value that increases with time as shown by the waveform 553. As an example, from time $t_{25}$ to time $t_{26}$, the voltage 327 increases with time as shown by the waveform 527.

At time $t_{26}$, the voltage 327 becomes equal to the voltage 351 as shown by the waveform 527, and the drive voltage 325 changes from the logic low level to the logic high level as shown by the waveform 525 according to certain embodiments. For example, at time $t_{26}$, the transistor 320 becomes turned on with zero-voltage switching (ZVS).

As shown in FIG. 3 and FIG. 5, from time $t_{20}$ to time $t_{22}$, the voltage 361 is clamped to a voltage value that is close to zero volts by the conduction controller 960 as shown by the waveform 461 according to some embodiments. According to certain embodiments, if the output voltage 392 is constant, the time duration from the time (e.g., time $t_{24}$) when the signal 931 changes from the logic low level to the logic high level as shown by the waveform 531 and the transistor 330 becomes turned on to the time (e.g., time $t_{25}$) when the drive voltage 335 changes from the logic high level to the logic low level is directly proportional to $(V_{in} - V_o \times N)$, where $V_{in}$ represents the voltage 351, $V_o$ represents the output voltage 392, and N represents the ratio of the number of turns of the primary winding 310 to the number of turns of the secondary winding 312. For example, if $V_{in}$ is equal to $V_{in\_c}$ and $V_o$ is equal to $V_{o\_p}$, the time duration from the time (e.g., time $t_{24}$) when the signal 931 changes from the logic low level to the logic high level as shown by the waveform 531 and the transistor 330 becomes turned on to the time (e.g., time $t_{25}$) when the drive voltage 335 changes from the logic high level to the logic low level is equal to $T_{zvs\_c}$. As an example, if $V_{in}$ is equal to $V_{in\_d}$ and $V_o$ is equal to $V_{o\_p}$, the time duration from the time (e.g., time $t_{24}$) when the signal 931 changes from the logic low level to the logic high level as shown by the waveform 531 and the transistor 330 becomes turned on to the time (e.g., time $t_{25}$) when the drive voltage 335 changes from the logic high level to the logic low level is equal to $T_{zvs\_d}$. As an example, the ratio of $T_{zvs\_c}$ to $T_{zvs\_d}$ is determined as follows:

$$\frac{T_{ZVS\_c}}{T_{ZVS\_d}} = \frac{V_{in\_c} - V_{o\_p} \times N}{V_{in\_d} - V_{o\_p} \times N} \qquad \text{(Equation 8)}$$

In some examples, according to Equation 8, if the output voltage 392 is constant (e.g., equal to $V_{o\_p}$) but $V_{in}$ changes from $V_{in\_c}$ to $V_{in\_d}$, the time duration from the time (e.g., time $t_{24}$) when the signal 931 changes from the logic low level to the logic high level as shown by the waveform 531 and the transistor 330 becomes turned on to the time (e.g., time $t_{25}$) when the drive voltage 335 changes from the logic high level to the logic low level changes from $T_{zvs\_c}$ to $T_{zvs\_d}$.

Figure 6:
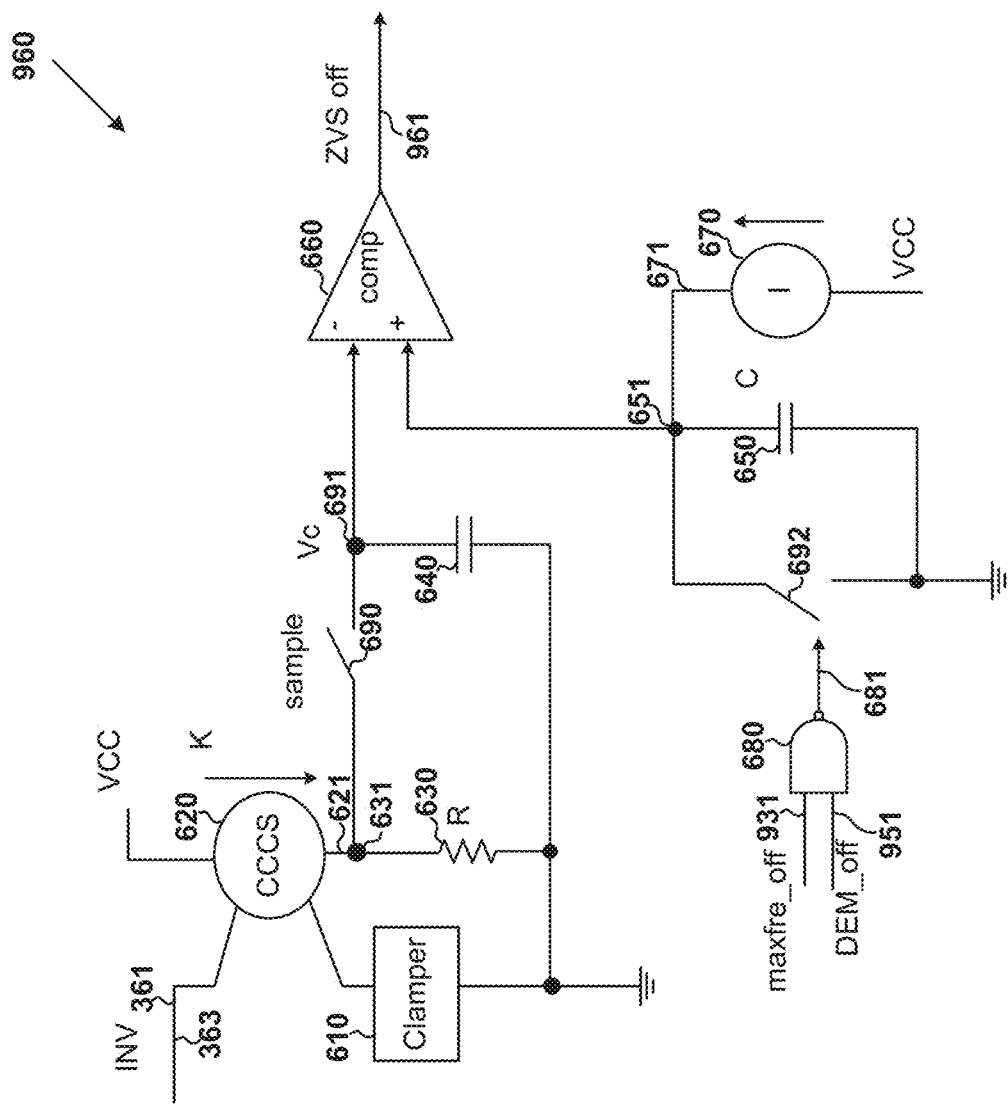
FIG. 6 is a simplified diagram showing certain components of the conduction controller as part of the asymmetrical half-bridge flyback switch-mode power converter as shown in FIG. 3 according to some embodiments of the present invention.

FIG. 6 is a simplified diagram showing certain components of the conduction controller 960 as part of the asymmetrical half-bridge flyback switch-mode power converter 300 as shown in FIG. 3 according to some embodiments of the present invention. This diagram is merely an example, which should not unduly limit the scope of the claims. One of ordinary skill in the art would recognize many variations, alternatives, and modifications. The conduction controller 960 includes a voltage damper 610, a current-controlled current source 620, a resistor 630, capacitors 640 and 650, a comparator 660, a current source 670, a NAND gate 680, and switches 690 and 692. Although the above has been shown using a selected group of components for the conduction controller, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the voltage 361 is clamped to a voltage value that is close to zero volts by the voltage damper 610 under certain conditions (e.g., from time $t_{10}$ to time $t_{12}$ as shown in FIG. 4 and/or from time $t_{20}$ to time $t_{22}$ as shown in FIG. 5). For example, when the voltage damper 610 is clamped to the voltage value that is close to zero volts, the current 363 is generated to flow out of the conduction controller 960 and then flows from the resistor 360 to the auxiliary winding 314 without going through the resistor 362. As an example, the current 363 has a negative value that is directly proportional to $(V_{in} - V_o \times N)$, where $V_{in}$ represents the voltage 351, $V_o$ represents the output voltage 392, and N represents the ratio of the number of turns of the primary winding 310 to the number of turns of the secondary winding 312.

According to some embodiments, based at least in part on the current 363, the current-controlled current source 620 generates a current 621 that is directly proportional to the current 363. For example, the current 621 is directly proportional to $(V_{in} - V_o \times N)$, where $V_{in}$ represents the voltage 351, $V_o$ represents the output voltage 392, and N represents the ratio of the number of turns of the primary winding 310 to the number of turns of the secondary winding 312. As an example, the current 621 flows through the resistor 630 to generate a voltage 631 that is directly proportional to $(V_{in} - V_o \times N)$, where $V_{in}$ represents the voltage 351, $V_o$ represents the output voltage 392, and N represents the ratio of the number of turns of the primary winding 310 to the number of turns of the secondary winding 312.

In certain embodiments, when the transistor 320 is turned on, the switch 690 becomes turned on and then becomes turned off in order to sample the voltage 631. For example, the sampled voltage 631 is held by the capacitor 640, which provides a voltage 691. As an example, the voltage 691 is directly proportional to ($V_{in}$–$V_o$×N), where $V_{in}$ represents the voltage 351, $V_o$ represents the output voltage 392, and N represents the ratio of the number of turns of the primary winding 310 to the number of turns of the secondary winding 312.

In some embodiments, the NAND gate 680 receives the signal 931 and the demagnetization signal 951 and generates a signal 681 based at least in part on the signal 931 and the demagnetization signal 951. In certain examples, if the signal 931 is at the logic high level and the demagnetization signal 951 is also at the logic high level (e.g., from time $t_{13}$ to time $t_{14}$ as shown in FIG. 4 and/or from time $t_{24}$ to time $t_{25}$ as shown in FIG. 5), the signal 681 is the logic low level and the switch 692 is open. For example, when the switch 692 is open, the current source 670 generates a constant current 671, which charges the capacitor 650 to increase a voltage 651. In some examples, if the signal 931 and/or the demagnetization signal 951 is at the logic low level, the signal 681 is the logic high level and the switch 692 is closed. For example, when the switch 692 is closed, the voltage 651 remains at the ground (e.g., zero volts).

According to certain embodiments, the voltage 691 and the voltage 651 are received by the comparator 660, which generates the signal 961 based at least in part on the voltage 691 and the voltage 651. For example, if the voltage 651 becomes larger than the voltage 691, the signal 961 changes from the logic low level to the logic high level. As an example, if the signal 961 changes from the logic low level to the logic high level, the drive voltage 335 changes from the logic high level to the logic low level to turn off the transistor 330. In some examples, the voltage 691 is directly proportional to ($V_{in}$–$V_o$×N), where $V_{in}$ represents the voltage 351, $V_o$ represents the output voltage 392, and N represents the ratio of the number of turns of the primary winding 310 to the number of turns of the secondary winding 312. In certain examples, when the signal 931 is at the logic high level and the demagnetization signal 951 is also at the logic high level (e.g., from time $t_{13}$ to time $t_{14}$ as shown in FIG. 4 and/or from time $t_{24}$ to time $t_{25}$ as shown in FIG. 5), the switch 692 is open and the constant current 671, which is generated by the current source 670, charges the capacitor 650 to increase the voltage 651.

According to some embodiments, the time duration (e.g., from time $t_{13}$ to time $t_{14}$ as shown in FIG. 4 and/or from time $t_{24}$ to time $t_{25}$ as shown in FIG. 5) that is needed for the voltage 651 to reach the voltage 691 from the ground voltage (e.g., zero volts) and for the drive voltage 335 changes from the logic high level to the logic low level to turn off the transistor 330 is directly proportional to ($V_{in}$–$V_o$×N), where $V_{in}$ represents the voltage 351, $V_o$ represents the output voltage 392, and N represents the ratio of the number of turns of the primary winding 310 to the number of turns of the secondary winding 312. For example, the ratio of the time duration (e.g., from time $t_{13}$ to time $t_{14}$ as shown in FIG. 4 and/or from time $t_{24}$ to time $t_{25}$ as shown in FIG. 5) to ($V_{in}$–$V_o$×N) changes with the changing resistance of the resistor 360.

In certain embodiments, as shown in FIG. 4, the time duration from time $t_{13}$ to time $t_{14}$ is directly proportional to ($V_{in}$–$V_o$×N), where $V_{in}$ represents the voltage 351, $V_o$ represents the output voltage 392, and N represents the ratio of the number of turns of the primary winding 310 to the number of turns of the secondary winding 312. In some embodiments, as shown in FIG. 5, the time duration from time $t_{24}$ to time $t_{25}$ is directly proportional to ($V_{in}$–$V_o$×N), where $V_{in}$ represents the voltage 351, $V_o$ represents the output voltage 392, and N represents the ratio of the number of turns of the primary winding 310 to the number of turns of the secondary winding 312.

According to some embodiments, a controller for a power converter includes: a first drive signal generator configured to generate a first drive signal and output the first drive signal to a first transistor configured to receive an input voltage and related to a primary winding coupled to an auxiliary winding and a secondary winding related to an output voltage; a second drive signal generator configured to generate a second drive signal and output the second drive signal to a second transistor coupled to the first transistor and related to the primary winding; a demagnetization detector configured to generate a demagnetization signal based at least in part on a first voltage related to the auxiliary winding, the demagnetization signal indicating an end of a demagnetization process; and a first controller configured to generate a first control signal based at least in part on the demagnetization signal and a first current related to the auxiliary winding; wherein the second drive signal generator is further configured to: receive the first control signal; and generate the second drive signal based at least in part on the first control signal; wherein the first controller is further configured to: determine a time duration that starts at the end of the demagnetization process based at least in part on the first current; and at an end of the time duration, change the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding. For example, the controller is implemented according to at least FIG. 3 and/or FIG. 4.

As an example, the controller further includes: a second controller configured to: generate a second control signal and a third control signal; output the second control signal to the first drive signal generator; and output the third control signal to the second drive signal generator. For example, the second controller is further configured to: a first predetermined delay after the first drive signal changes to turn off the first transistor, change the third logic signal to turn on the second transistor; and a second predetermined delay after the second drive signal changes to turn off the second transistor, change the second logic signal to turn on the first transistor. As an example, the first predetermined delay and the second predetermined delay are not equal in length.

For example, the demagnetization detector is further configured to, at the end of the demagnetization process, change the demagnetization signal to indicate the end of the demagnetization process. As an example, the controller further includes: a comparator configured to: receive a second voltage and a third voltage, the second voltage representing a second current flowing through the primary winding, the third voltage being related to the output voltage; and generate a comparison signal based at least in part on the second voltage and the third voltage. For example, the first drive signal generator is further configured to receive the comparison signal and generate the first drive signal based at least in part on the comparison signal. As an example, the comparator is further configured to, if the second voltage becomes larger than the third voltage, change the comparison signal to turn off the first transistor.

According to certain embodiments, a controller for a power converter includes: a first drive signal generator configured to generate a first drive signal and output the first drive signal to a first transistor configured to receive an input voltage and related to a primary winding coupled to a secondary winding and an auxiliary winding; a second drive signal generator configured to generate a second drive signal and output the second drive signal to a second transistor coupled to the first transistor and related to the primary winding; a frequency controller configured to generate a frequency control signal; and a first controller configured to generate a first control signal based at least in part on the frequency control signal and a first current related to the auxiliary winding; wherein the second drive signal generator is further configured to: receive the first control signal; and generate the second drive signal based at least in part on the first control signal; wherein the first controller is further configured to: determine a time duration that starts at a time when the frequency control signal changes; and at an end of the time duration, change the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding. For example, the controller is implemented according to at least FIG. 3 and/or FIG. 5.

As an example, the controller further includes: a second controller configured to: generate a second control signal and a third control signal; output the second control signal to the first drive signal generator; and output the third control signal to the second drive signal generator. For example, the second controller is further configured to: a first predetermined delay after the first drive signal changes to turn off the first transistor, change the third logic signal to turn on the second transistor; and a second predetermined delay after the second drive signal changes to turn off the second transistor, change the second logic signal to turn on the first transistor. As an example, the first predetermined delay and the second predetermined delay are not equal in length.

For example, the first controller is further configured to determine the time duration that starts at the time when the frequency control signal changes from a logic low level to a logic high level. As an example, the controller further includes: a comparator configured to: receive a second voltage and a third voltage, the second voltage representing a second current flowing through the primary winding, the third voltage being related to the output voltage; and generate a comparison signal based at least in part on the second voltage and the third voltage. For example, the first drive signal generator is further configured to receive the comparison signal and generate the first drive signal based at least in part on the comparison signal. As an example, the comparator is further configured to, if the second voltage becomes larger than the third voltage, change the comparison signal to turn off the first transistor.

According to some embodiments, a method for a power converter includes: generating a first drive signal; outputting the first drive signal to a first transistor configured to receive an input voltage and related to a primary winding coupled to an auxiliary winding and a secondary winding related to an output voltage; generating a second drive signal; outputting the second drive signal to a second transistor coupled to the first transistor and related to the primary winding; generating a demagnetization signal based at least in part on a first voltage related to the auxiliary winding, the demagnetization signal indicating an end of a demagnetization process; and generating a first control signal based at least in part on the demagnetization signal and a first current related to the auxiliary winding; wherein the generating a second drive signal includes: receiving the first control signal; and generating the second drive signal based at least in part on the first control signal; wherein the generating a first control signal based at least in part on the demagnetization signal and a first current includes: determining a time duration that starts at the end of the demagnetization process based at least in part on the first current; and at an end of the time duration, changing the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding. For example, the method is implemented according to at least FIG. 3 and/or FIG. 4.

As an example, the generating a second drive signal includes: a first predetermined delay after the first drive signal changes to turn off the first transistor, changing the second drive signal to turn on the second transistor; the generating a first drive signal includes: a second predetermined delay after the second drive signal changes to turn off the second transistor, changing the first drive signal to turn on the first transistor. For example, the first predetermined delay and the second predetermined delay are not equal in length. As an example, the generating a demagnetization signal based at least in part on a first voltage includes, at the end of the demagnetization process, changing the demagnetization signal to indicate the end of the demagnetization process.

For example, the method further includes: receiving a second voltage and a third voltage, the second voltage representing a second current flowing through the primary winding, the third voltage being related to the output voltage; and generating a comparison signal based at least in part on the second voltage and the third voltage. As an example, the generating a first drive signal includes: receiving the comparison signal; and generating the first drive signal based at least in part on the comparison signal. For example, the generating the first drive signal based at least in part on the comparison signal includes: if the second voltage becomes larger than the third voltage, changing the comparison signal to turn off the first transistor.

According to certain embodiments, a method for a power converter includes: generating a first drive signal; outputting the first drive signal to a first transistor configured to receive an input voltage and related to a primary winding coupled to a secondary winding and an auxiliary winding; generating a second drive signal; outputting the second drive signal to a second transistor coupled to the first transistor and related to the primary winding;

generating a frequency control signal; and generating a first control signal based at least in part on the frequency control signal and a first current related to the auxiliary winding; wherein the generating a second drive signal includes: receiving the first control signal; and generating the second drive signal based at least in part on the first control signal; wherein the generating a first control signal based at least in part on the frequency control signal and a first current includes: determining a time duration that starts at a time when the frequency control signal changes; and at an end of the time duration, changing the first control signal to turn off the second transistor; wherein: if the output voltage is constant, the time duration is directly proportional to the input voltage minus the output voltage multiplied by a ratio; and the ratio is equal to a first number of turns of the primary winding divided by a second number of turns of the secondary winding. For example, the method is implemented according to at least FIG. 3 and/or FIG. 5.

As an example, the generating a second drive signal includes: a first predetermined delay after the first drive signal changes to turn off the first transistor, changing the second drive signal to turn on the second transistor; the generating a first drive signal includes: a second predetermined delay after the second drive signal changes to turn off the second transistor, change the first drive signal to turn on the first transistor. For example, the first predetermined delay and the second predetermined delay are not equal in length. As an example, the determining a time duration that starts at a time when the frequency control signal changes includes: determining the time duration that starts at the time when the frequency control signal changes from a logic low level to a logic high level.

For example, the method further includes: receiving a second voltage and a third voltage, the second voltage representing a second current flowing through the primary winding, the third voltage being related to the output voltage; and generating a comparison signal based at least in part on the second voltage and the third voltage. As an example, the generating a first drive signal includes: receiving the comparison signal; and generating the first drive signal based at least in part on the comparison signal. For example, the generating the first drive signal based at least in part on the comparison signal includes: if the second voltage becomes larger than the third voltage, changing the comparison signal to turn off the first transistor.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:
   a first drive signal generator configured to generate a first drive signal and output the first drive signal to a first transistor configured to receive an input voltage and related to a primary winding coupled to an auxiliary winding and a secondary winding related to an output voltage;
   a second drive signal generator configured to generate a second drive signal and output the second drive signal to a second transistor coupled to the first transistor and related to the primary winding;
   a demagnetization detector configured to generate a demagnetization signal based at least in part on a first voltage related to the auxiliary winding, the demagnetization signal indicating an end of a demagnetization process; and
   a first controller configured to generate a first control signal based at least in part on the demagnetization signal and a first current related to the auxiliary winding;
   wherein the second drive signal generator is further configured to:
      receive the first control signal; and
      generate the second drive signal based at least in part on the first control signal;
   wherein the first controller is further configured to:
      determine a time duration that starts at the end of the demagnetization process based at least in part on the first current; and
      at an end of the time duration, change the first control signal to turn off the second transistor;
   wherein:
      if the output voltage is constant, the time duration is directly proportional to the input voltage minus the output voltage multiplied by a ratio; and
      the ratio is equal to a first number of turns of the primary winding divided by a second number of turns of the secondary winding.

2. The controller of claim 1, and further comprising:
   a second controller configured to:
      generate a second control signal and a third control signal;
      output the second control signal to the first drive signal generator; and
      output the third control signal to the second drive signal generator.

3. The controller of claim 2 wherein the second controller is further configured to:
   a first predetermined delay after the first drive signal changes to turn off the first transistor, change the third logic signal to turn on the second transistor; and
   a second predetermined delay after the second drive signal changes to turn off the second transistor, change the second logic signal to turn on the first transistor.

4. The controller of claim 3 wherein the first predetermined delay and the second predetermined delay are not equal in length.

5. The controller of claim 1 wherein the demagnetization detector is further configured to, at the end of the demagnetization process, change the demagnetization signal to indicate the end of the demagnetization process.

6. The controller of claim 1, and further comprising:
   a comparator configured to:
      receive a second voltage and a third voltage, the second voltage representing a second current flowing through the primary winding, the third voltage being related to the output voltage; and
      generate a comparison signal based at least in part on the second voltage and the third voltage.

7. The controller of claim 6 wherein the first drive signal generator is further configured to receive the comparison signal and generate the first drive signal based at least in part on the comparison signal.

8. The controller of claim 7 wherein the comparator is further configured to, if the second voltage becomes larger than the third voltage, change the comparison signal to turn off the first transistor.

9. A controller for a power converter, the controller comprising:
   a first drive signal generator configured to generate a first drive signal and output the first drive signal to a first transistor configured to receive an input voltage and related to a primary winding coupled to a secondary winding and an auxiliary winding;
a second drive signal generator configured to generate a second drive signal and output the second drive signal to a second transistor coupled to the first transistor and related to the primary winding;
a frequency controller configured to generate a frequency control signal; and
a first controller configured to generate a first control signal based at least in part on the frequency control signal and a first current related to the auxiliary winding;
wherein the second drive signal generator is further configured to:
receive the first control signal; and
generate the second drive signal based at least in part on the first control signal;
wherein the first controller is further configured to:
determine a time duration that starts at a time when the frequency control signal changes; and
at an end of the time duration, change the first control signal to turn off the second transistor;
wherein:
if the output voltage is constant, the time duration is directly proportional to the input voltage minus the output voltage multiplied by a ratio; and
the ratio is equal to a first number of turns of the primary winding divided by a second number of turns of the secondary winding.

10. The controller of claim 9, and further comprising:
a second controller configured to:
generate a second control signal and a third control signal;
output the second control signal to the first drive signal generator; and
output the third control signal to the second drive signal generator.

11. The controller of claim 10 wherein the second controller is further configured to:
a first predetermined delay after the first drive signal changes to turn off the first transistor, change the third logic signal to turn on the second transistor; and
a second predetermined delay after the second drive signal changes to turn off the second transistor, change the second logic signal to turn on the first transistor.

12. The controller of claim 11 wherein the first predetermined delay and the second predetermined delay are not equal in length.

13. The controller of claim 9 wherein the first controller is further configured to determine the time duration that starts at the time when the frequency control signal changes from a logic low level to a logic high level.

14. The controller of claim 9, and further comprising:
a comparator configured to:
receive a second voltage and a third voltage, the second voltage representing a second current flowing through the primary winding, the third voltage being related to the output voltage; and
generate a comparison signal based at least in part on the second voltage and the third voltage.

15. The controller of claim 14 wherein the first drive signal generator is further configured to receive the comparison signal and generate the first drive signal based at least in part on the comparison signal.

16. The controller of claim 15 wherein the comparator is further configured to, if the second voltage becomes larger than the third voltage, change the comparison signal to turn off the first transistor.

17. A method for a power converter, the method comprising:
generating a first drive signal;
outputting the first drive signal to a first transistor configured to receive an input voltage and related to a primary winding coupled to an auxiliary winding and a secondary winding related to an output voltage;
generating a second drive signal;
outputting the second drive signal to a second transistor coupled to the first transistor and related to the primary winding;
generating a demagnetization signal based at least in part on a first voltage related to the auxiliary winding, the demagnetization signal indicating an end of a demagnetization process; and
generating a first control signal based at least in part on the demagnetization signal and a first current related to the auxiliary winding;
wherein the generating a second drive signal includes:
receiving the first control signal; and
generating the second drive signal based at least in part on the first control signal;
wherein the generating a first control signal based at least in part on the demagnetization signal and a first current includes:
determining a time duration that starts at the end of the demagnetization process based at least in part on the first current; and
at an end of the time duration, changing the first control signal to turn off the second transistor;
wherein:
if the output voltage is constant, the time duration is directly proportional to the input voltage minus the output voltage multiplied by a ratio; and
the ratio is equal to a first number of turns of the primary winding divided by a second number of turns of the secondary winding.

18. The method of claim 17 wherein:
the generating a second drive signal includes:
a first predetermined delay after the first drive signal changes to turn off the first transistor, changing the second drive signal to turn on the second transistor;
the generating a first drive signal includes:
a second predetermined delay after the second drive signal changes to turn off the second transistor, changing the first drive signal to turn on the first transistor.

19. The method of claim 18 wherein the first predetermined delay and the second predetermined delay are not equal in length.

20. The method of claim 17 wherein the generating a demagnetization signal based at least in part on a first voltage includes, at the end of the demagnetization process, changing the demagnetization signal to indicate the end of the demagnetization process.

21. The method of claim 17, and further comprising:
receiving a second voltage and a third voltage, the second voltage representing a second current flowing through the primary winding, the third voltage being related to the output voltage; and
generating a comparison signal based at least in part on the second voltage and the third voltage.

22. The method of claim 21 wherein the generating a first drive signal includes:
  receiving the comparison signal; and
  generating the first drive signal based at least in part on the comparison signal.

23. The method of claim 22 wherein the generating the first drive signal based at least in part on the comparison signal includes:
  if the second voltage becomes larger than the third voltage, changing the comparison signal to turn off the first transistor.

24. A method for a power converter, the method comprising:
  generating a first drive signal;
  outputting the first drive signal to a first transistor configured to receive an input voltage and related to a primary winding coupled to a secondary winding and an auxiliary winding;
  generating a second drive signal;
  outputting the second drive signal to a second transistor coupled to the first transistor and related to the primary winding;
  generating a frequency control signal; and
  generating a first control signal based at least in part on the frequency control signal and a first current related to the auxiliary winding;
  wherein the generating a second drive signal includes:
    receiving the first control signal; and
    generating the second drive signal based at least in part on the first control signal;
  wherein the generating a first control signal based at least in part on the frequency control signal and a first current includes:
    determining a time duration that starts at a time when the frequency control signal changes; and
    at an end of the time duration, changing the first control signal to turn off the second transistor;
  wherein:
    if the output voltage is constant, the time duration is directly proportional to the input voltage minus the output voltage multiplied by a ratio; and
    the ratio is equal to a first number of turns of the primary winding divided by a second number of turns of the secondary winding.

25. The method of claim 24 wherein:
  the generating a second drive signal includes:
    a first predetermined delay after the first drive signal changes to turn off the first transistor, changing the second drive signal to turn on the second transistor;
  the generating a first drive signal includes:
    a second predetermined delay after the second drive signal changes to turn off the second transistor, change the first drive signal to turn on the first transistor.

26. The method of claim 25 wherein the first predetermined delay and the second predetermined delay are not equal in length.

27. The method of claim 24 wherein the determining a time duration that starts at a time when the frequency control signal changes includes:
  determining the time duration that starts at the time when the frequency control signal changes from a logic low level to a logic high level.

28. The method of claim 24, and further comprising:
  receiving a second voltage and a third voltage, the second voltage representing a second current flowing through the primary winding, the third voltage being related to the output voltage; and
  generating a comparison signal based at least in part on the second voltage and the third voltage.

29. The method of claim 28 wherein the generating a first drive signal includes:
  receiving the comparison signal; and
  generating the first drive signal based at least in part on the comparison signal.

30. The method of claim 29 wherein the generating the first drive signal based at least in part on the comparison signal includes:
  if the second voltage becomes larger than the third voltage, changing the comparison signal to turn off the first transistor.

* * * * *